US010068042B1

(12) United States Patent
Mendel et al.

(10) Patent No.: US 10,068,042 B1
(45) Date of Patent: Sep. 4, 2018

(54) METHODS AND APPARATUS FOR REGULATING THE SUPPLY VOLTAGE OF AN INTEGRATED CIRCUIT

(71) Applicant: Altera Corporation, San Jose, CA (US)

(72) Inventors: David W. Mendel, San Jose, CA (US); Khong Seng Foo, Penang (MY)

(73) Assignee: Altera Corporation, San Jose, CA (US)

( * ) Notice: Subject to any disclaimer, the term of this patent is extended or adjusted under 35 U.S.C. 154(b) by 128 days.

(21) Appl. No.: 14/985,514

(22) Filed: Dec. 31, 2015

(51) Int. Cl.
G06F 9/455 (2018.01)
G06F 17/50 (2006.01)

(52) U.S. Cl.
CPC .............. G06F 17/5031 (2013.01)

(58) Field of Classification Search
USPC ........................................ 716/108
See application file for complete search history.

(56) References Cited

U.S. PATENT DOCUMENTS 9,496,871 B1* 11/2016 Devlin ............... H03K 19/0016
2005/0201188 A1* 9/2005 Donze ..................... G06F 1/206
365/232
2010/0229137 A1* 9/2010 Liu ..................... G06F 17/5031
716/113

* cited by examiner

Primary Examiner — Bryce Aisaka
(74) Attorney, Agent, or Firm — Compass IP Law PC

(57) ABSTRACT

The present embodiments relate to regulating the supply voltage of an integrated circuit. The integrated circuit may implement a circuit design. The circuit design implementation may meet timing constraints with timing margins when operated with the integrated circuit at a nominal supply voltage level. The integrated circuit may further include a voltage identification controller. The voltage identification controller may determine a reduced voltage level based at least on the timing margins such that operating the circuit design implementation with the integrated circuit meets timing constraints. The voltage identification controller may direct a voltage regulator, which may be included in the integrated circuit or located outside the integrated circuit, to reduce the supply voltage level from the nominal supply voltage level to the reduced voltage level, thereby reducing the power consumption of the integrated circuit.

18 Claims, 9 Drawing Sheets

METHODS AND APPARATUS FOR REGULATING THE SUPPLY VOLTAGE OF AN INTEGRATED CIRCUIT

BACKGROUND

The present embodiments relate to integrated circuits and, more particularly, to regulating the supply voltage of an integrated circuit.

In recent years, there has been an increasing demand for integrated circuits to operate at higher speeds while minimizing power consumption. Power consumption depends heavily on the supply voltage of the integrated circuit. An increase in supply voltage generally leads to an increase in performance, but also to higher power consumption. A decrease in supply voltage generally leads to lower power consumption, but also to a decrease in performance. To achieve the desired balance between power consumption and performance across a wide variety of applications and operation conditions, integrated circuits are sometimes provided with dynamic voltage-frequency scaling (DVFS) capabilities.

In a conventional dynamic voltage-frequency scaling scheme, an integrated circuit is able to operate at different voltage-frequency points. When higher performance is needed, the voltage can be increased to reduce gate delays and to allow for an increase in clocking frequency and thus higher performance. When low power consumption is desired, the clocking frequency is decreased to allow for a reduction in voltage and thus lower power consumption. The integrated circuit is usually placed in these different voltage-frequency states depending on changes in current incoming workload or operating conditions.

The relationship between the voltage and frequency is, however, fixed at design time and depends mostly on the selected process corners at fabrication and on the selected circuit structure, neither of which can be adjusted after fabrication.

SUMMARY

A method for operating an integrated circuit may include using a computer-aided design (CAD) tool. The CAD tool may receive a timing model for the integrated circuit and a circuit design implementation with timing constraints. The CAD tool may determine timing margins by performing timing analysis of the circuit design implementation with the integrated circuit based on the timing model and the timing constraints. The CAD tool may further determine an actual voltage that is based on the timing margins, and the circuit design implementation with the integrated circuit may be operated at the actual voltage.

It is appreciated that the embodiments described herein can be implemented in numerous ways, such as a process, an apparatus, a system, a device, or a method executed on a processing machine. Several inventive embodiments of the present invention are described below.

In certain embodiments, the above mentioned CAD tool may generate estimated timing information based on the timing model and signal propagation delays along paths between synchronous circuit elements in the circuit design implementation with the integrated circuit. The CAD tool may further determine the timing margins by comparing the estimated timing information with the timing constraints.

During operation, the integrated circuit may have a first temperature during a first time interval, and a temperature sensor may measure a second temperature of the integrated circuit that is different than the first temperature during a second time interval. If desired, a voltage controller may change the actual voltage to a current voltage that is different than the actual voltage to adapt to the second temperature of the integrated circuit, and the circuit design implementation with the integrated circuit may be operated at the current voltage.

Further features of the invention, its nature and various advantages, will be more apparent from the accompanying drawings and the following detailed description of the preferred embodiments.

DETAILED DESCRIPTION

The present embodiments provided herein relate to integrated circuits and, more particularly, to regulating the supply voltage of an integrated circuit and to methods for using computer-aided design (CAD) tools, which are sometimes also referred to as design automation (DA) tools or electronic design automation (EDA) tools, for selecting the supply voltage of an integrated circuit.

An integrated circuit may operate at different voltage-frequency points depending on when high performance or low power consumption is desired. Conventional integrated circuits are usually placed in different voltage-frequency states depending on changes in current incoming workload or operating conditions. The relationship between the voltage and frequency is, however, fixed at design time and depends mostly on the selected process corners at fabrication and on the selected circuit structure, neither of which can be adjusted after fabrication.

Therefore, it may be desirable to enable an additional supply voltage reduction which may be adjustable after fabrication of the integrated circuit.

It will be recognized by one skilled in the art, that the present exemplary embodiments may be practiced without some or all of these specific details. In other instances, well-known operations have not been described in detail in order not to unnecessarily obscure the present embodiments.

Figure 1:
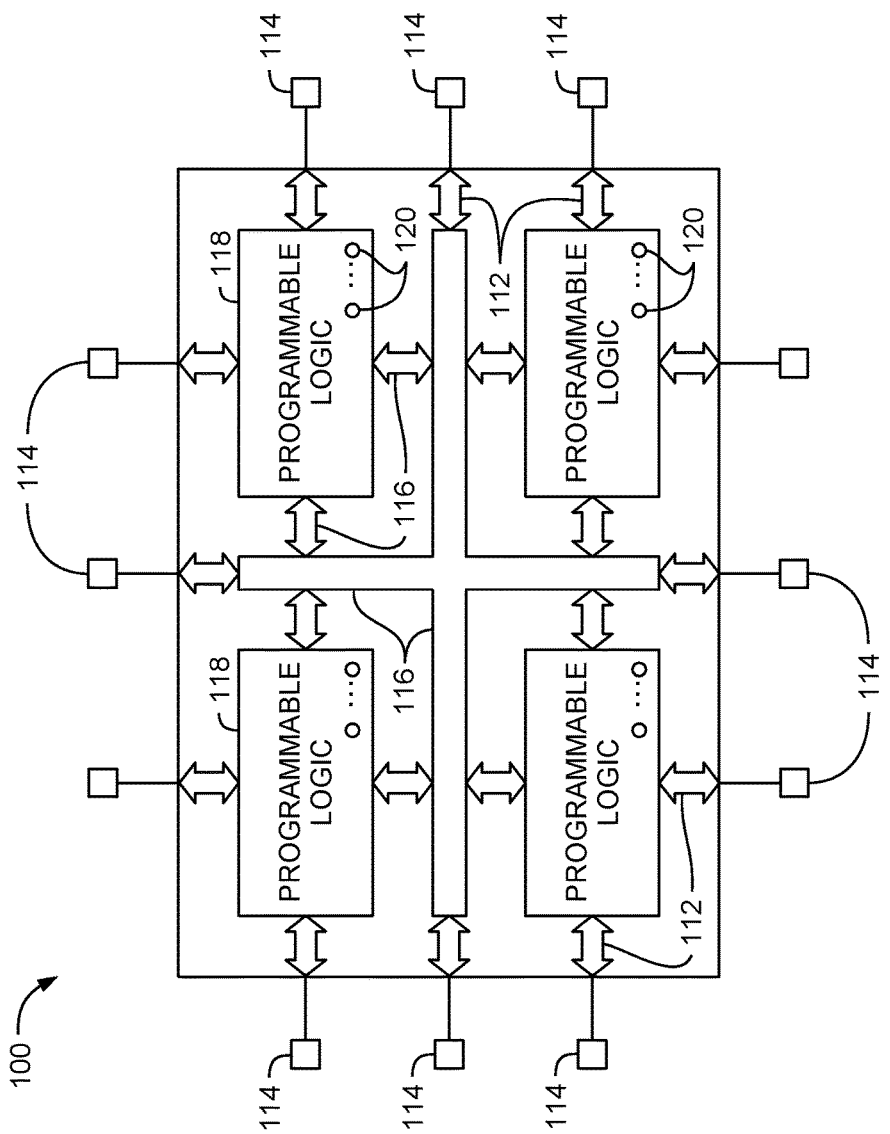
FIG. 1 is a diagram of an illustrative integrated circuit in accordance with an embodiment.

An illustrative circuit design system in accordance with an embodiment is shown in FIG. 1. As shown in FIG. 1, integrated circuit 100 may have input-output (I/O) circuitry 112 for driving signals off of integrated circuit 100 and for receiving signals from other circuits via input-output pins 114.

Input-output circuitry 112 may include general-purpose input-output (GPIO) circuitry, which may be configured to be an input or an output. If desired, input-output circuitry 112 may include interface circuitry that accommodates communications using different protocols and/or standards. Protocols and standards that may be implemented using input-output circuitry 112 may include network standards and protocols such as low-voltage differential signaling (LVDS), Interlaken, Peripheral Component Interconnect Express (PCIe), Ethernet, gigabit Ethernet (GigE) such as the 10 Gigabit Attachment Unit Interface (XAUI), or other communications network standards or protocols. Memory standards such as double-data-rate (DDR) memory standards may be implemented using input-output circuitry 112. These examples are merely illustrative. If desired, any suitable interface and any number of desired interfaces for communicating with external circuitry may be implemented using input-output circuitry 112. Input-output circuitry 112 may be coupled to corresponding input-output pins 114.

Interconnection resources 116 such as global and local vertical, horizontal, and diagonal conductive lines and buses may be used to route signals on integrated circuit 100. Interconnection resources 116 may include fixed interconnects such as conductive lines. If desired, interconnection resources 116 may include programmable interconnects (i.e., programmable connections between respective fixed interconnects). Interconnection resources 116 may sometimes be referred to herein as interconnect resources or interconnects (e.g., interconnects formed from combinations of fixed interconnects and programmable interconnects).

Interconnects 116 may be used to couple circuitry in the integrated circuit. For example, interconnects 116 may interconnect regions of programmable logic such as programmable logic regions 118. Programmable logic regions 118 may sometimes be referred to as logic array blocks (LABs) or programmable circuit regions. Programmable logic regions 118, may, if desired, contain groups of smaller logic regions. These smaller logic regions, which may sometimes be referred to as logic elements (LEs), adaptive logic modules (ALMs), or configurable logic blocks (CLBs) may be interconnected using local interconnection resources.

Programmable logic regions 118 may include combinational and sequential logic circuitry. For example, programmable logic regions 118 may include look-up tables, logic gates (e.g., logic AND gates, logic OR gates, logic exclusive OR gates, inverter gates, etc.), synchronous circuitry (e.g., registers or flip-flops, latches, random-access memory (RAM), read-only memory (ROM), shift register logic (SRL), first-in first-out (FIFO) circuits, stacks or last-in first-out (LIFO) circuits, etc.), arithmetic operators (e.g., adders, multipliers, etc.), and multiplexers. Programmable logic regions 118 may be configured to perform a custom logic function.

Programmable logic regions 118 may contain programmable elements 120. Programmable elements 120 are sometimes also referred to as configuration RAM (CRAM) cells, configuration memory, memory cells, configuration cells, or configuration elements. Programmable elements 120 may be based on any suitable programmable technology, which may be volatile or non-volatile, such as fuses, antifuses, electrically-programmable read-only-memory technology, random-access memory cells, mask-programmed elements, optically programmable electron spin memory, etc. As an example, programmable elements 120 may be formed from memory cells. During programming, configuration data may be loaded into programmable elements 120 using input-output pins 114 and input-output circuitry 112. As an example, consider the scenario in which programmable elements 120 are random-access memory (RAM) cells. In this scenario, the RAM cells may store the configuration data during write access operations (e.g., as part of a boot procedure that integrated circuit 100 may perform during power-up, as part of partial reconfiguration of integrated circuit 100, etc.).

Programmable elements 120 may provide static control output signals for controlling the state of logic components in programmable logic 118. In certain embodiments, the output signals generated by programmable elements 120 may be applied to gates of metal-oxide-semiconductor (MOS) transistors. For example, the static control output signals may control pass gate transistors. These pass gate transistors may form a multiplexer in the programmable interconnect of interconnect resources 116. Thus, controlling the gates of the pass gate transistors may contribute to implementing a routing path in interconnect resources 116 between two circuits that are located in programmable logic regions 118.

In some scenarios, programmable elements 120 may provide static data output signals for programmable circuitry. For example, look-up tables may include programmable elements 120 that produce static data output signals. In this scenario, control signals may configure the look-up tables to provide the static data output signals at look-up table outputs based on the look-up table inputs.

The circuitry of integrated circuit 100 may be organized using any suitable architecture. As an example, programmable logic 118 of programmable integrated circuit 100 may be organized in a series of rows and columns of programmable logic regions, each of which may contain multiple smaller programmable logic regions. The logic resources of integrated circuit 100 may be interconnected by interconnection resources 116 such as associated vertical, horizontal, diagonal, and through-silicon-via (TSV) conductors. These conductors may include global conductive lines that span substantially all of integrated circuit 100, fractional global lines such as half-lines or quarter lines that span part of integrated circuit 100, staggered lines of a particular length (e.g., sufficient to interconnect a predetermined number of resources in programmable logic regions 118 or a sufficient to interconnect a predetermined number of programmable logic regions 118, etc.), smaller local lines, or any other suitable interconnection resource arrangement. If desired, the programmable logic regions 118 of integrated circuit 100 may be arranged in more levels or layers in which multiple logic regions are interconnected to form still larger portions of logic regions. Other device arrangements may include programmable logic regions that are not arranged in rows and columns.

Integrated circuit 100 may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using an integrated circuit with programmable or re-programmable logic is desirable. Integrated circuit 100 may be used to perform a variety of different logic functions. For example, integrated circuit 100 may be configured as a processor or controller that works in cooperation with a system processor. Integrated circuit 100 may also be used as an arbiter for arbitrating access to a shared resource in the data processing system. In yet another example, the integrated circuit 100 may be configured as an interface between a processor and one of the other components in the system. In one embodiment, the integrated circuit 100 may be one of the families of devices owned by the assignee.

In certain embodiments, a circuit designer may provide a circuit design, which may include timing constraints. If desired, a circuit design system may generate configuration data based on the circuit design. The configuration data may configure programmable elements 120, thereby generating a circuit design implementation with integrated circuit 100 based on the circuit design.

Figure 2A:
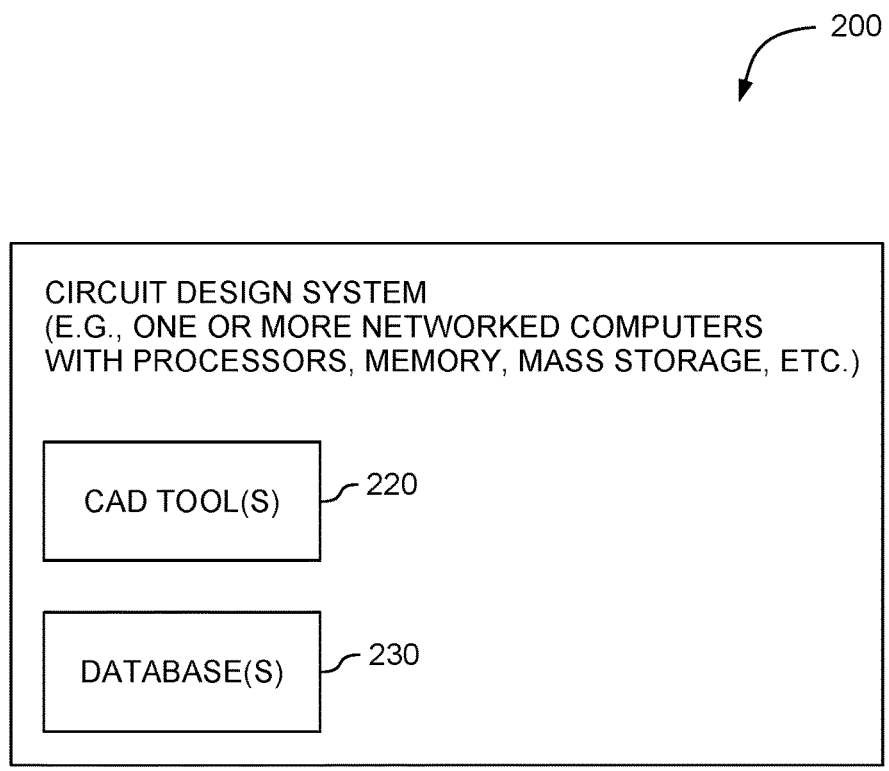
FIG. 2A is a diagram of a circuit design system that may be used to design integrated circuits in accordance with an embodiment.

An illustrative circuit design system 200 in accordance with an embodiment is shown in FIG. 2A. Circuit design system 200 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design (CAD) tools 220 and databases 230 may reside on circuit design system 200. During operation, executable software such as the software of computer-aided design (CAD) tools 220 may run on the processor(s) of circuit design system 200. Databases 230 may store data for the operation of circuit design system 200. If desired, software and data may be stored on any computer-readable medium (storage) in circuit design system 200. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s).

When the software of circuit design system 200 is installed, the storage of circuit design system 200 has instructions and data that may cause the computing equipment in circuit design system 200 to execute various methods (processes). When performing these processes, the computing equipment may be configured to implement the functions of the circuit design system.

The computer-aided design (CAD) tools 220, some or all of which are sometimes referred to collectively as a CAD tool or an electronic design automation (EDA) tool, may be provided by a single vendor or by multiple vendors. CAD tools 220 may be provided as one or more suites of tools (e.g., a compiler suite for performing tasks associated with implementing a circuit design in a programmable logic device) and/or as one or more separate software components (tools). Database(s) 230 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. CAD tools 220 may also pass information between each other without storing information in a shared database if desired.

Figure 2B:
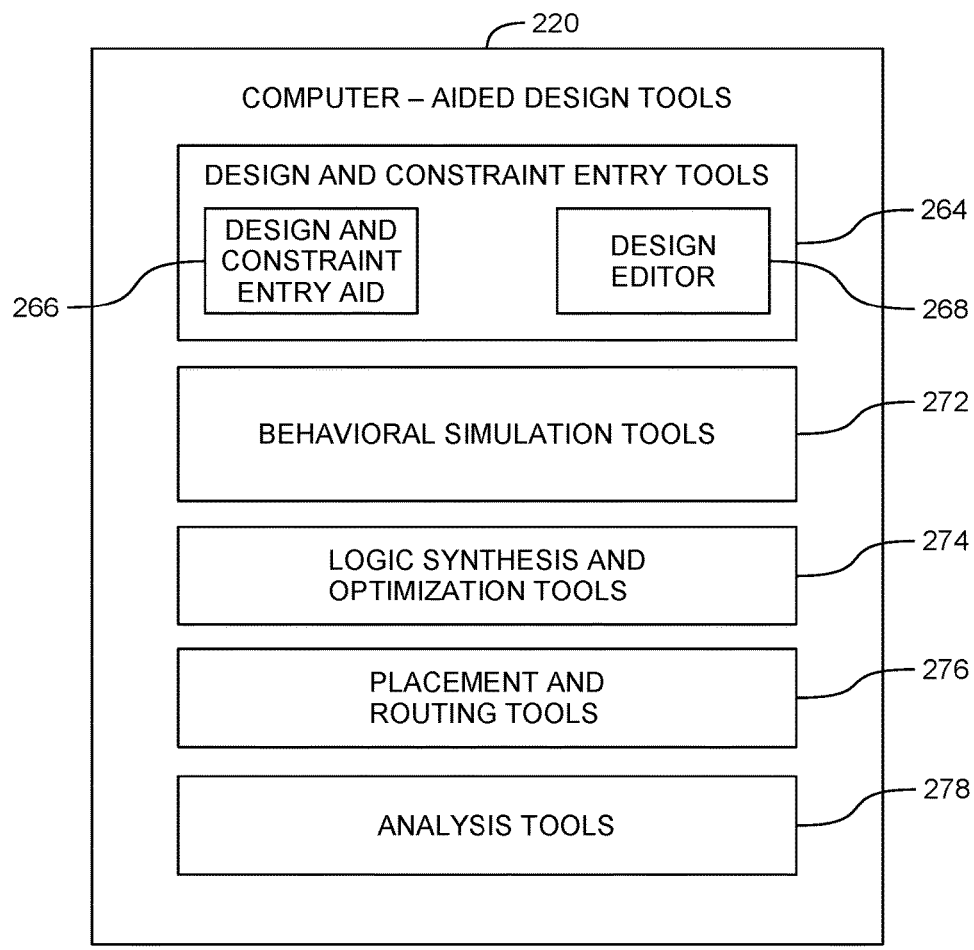
FIG. 2B is a diagram of illustrative computer-aided design (CAD) tools that may be used in a circuit design system in accordance with an embodiment.

Illustrative computer-aided design tools 220 that may be used in a circuit design system such as circuit design system 200 of FIG. 2A are shown in FIG. 2B.

The design process may start with the formulation of functional specifications of an integrated circuit design (e.g., a functional or behavioral description of the integrated circuit design). For example, a circuit designer may formulate the functional specification of a circuit design using design and constraint entry tools 264. Design and constraint entry tools 264 may include tools such as design and constraint entry aid 266 and design editor 268. Design and constraint entry aid 266 may be used to help a circuit designer retrieve a circuit design from a library of existing circuit designs and may provide computer-aided assistance to the circuit designer for entering (specifying) the circuit design.

As an example, design and constraint entry aid 266 may be used to present screens of options for a circuit designer. The circuit designer may click on on-screen options to select whether the circuit being designed should have certain features. Design editor 268 may be used to enter a design (e.g., by entering lines of hardware description language code), may be used to edit a design obtained from a library (e.g., using design and constraint entry aid 266), or may assist a circuit designer in selecting and editing appropriate prepackaged code/designs.

Design and constraint entry tools 264 may be used to allow a circuit designer to provide a desired circuit design using any suitable format. For example, design and constraint entry tools 264 may include tools that allow the circuit designer to enter a circuit design using truth tables. Truth tables may be specified using text files or timing diagrams and may be imported from a library. Truth table circuit design and constraint entry may be used for a portion of a circuit or for an entire circuit.

As another example, design and constraint entry tools 264 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a circuit design to be imported with the schematic capture tools.

If desired, design and constraint entry tools 264 may allow the circuit designer to provide a circuit design to the circuit design system 200 using a hardware description language such as Verilog Hardware Description Language (Verilog HDL) or Very High Speed Integrated Circuit Hardware Description Language (VHDL). The circuit designer may enter the circuit design by writing hardware description language code with design editor 268. Blocks of code may be imported from libraries maintained by the circuit designer and/or from commercial libraries if desired.

After the circuit design has been entered using design and constraint entry tools 264, behavioral simulation tools 272 may be used to simulate the functional performance of the circuit design. If the functional performance of the design is incomplete or incorrect, the circuit designer may make changes to the circuit design using design and constraint entry tools 264. The functional operation of the new circuit design may be verified using behavioral simulation tools 272 before synthesis operations are performed using logic synthesis and optimization tools 274. Simulation tools such as behavioral simulation tools 272 may also be used at other stages in the design flow if desired (e.g., after logic synthesis). The output of the behavioral simulation tools 272 may be provided to the circuit designer in any suitable format (e.g., truth tables, timing diagrams, etc.).

Once the functional operation of the circuit design has been determined to be satisfactory, logic synthesis and optimization tools 274 may generate a gate-level netlist of the circuit design, for example using gates from a particular library pertaining to a targeted process supported by a foundry, which has been selected to produce the integrated circuit. Alternatively, logic synthesis and optimization tools 274 may generate a gate-level netlist of the circuit design using gates of a targeted programmable integrated circuit (i.e., in the logic and interconnect resources of a particular programmable integrated circuit product or product family).

Logic synthesis and optimization tools 274 may optimize the circuit design by making appropriate selections of hardware to implement different logic functions in the circuit design based on the circuit design data and constraint data entered by the circuit designer using design and constraint entry tools 264.

After logic synthesis and optimization using logic synthesis and optimization tools 274, the circuit design system may use CAD tools such as placement and routing tools 276 to perform physical design steps (layout synthesis operations). Placement and routing tools 276 are used to determine where to place each gate of the gate-level netlist produced by logic synthesis and optimization tools 274. For example, if two counters interact with each other, the placement and routing tools 276 may locate these counters in adjacent regions of the integrated circuit to reduce interconnect delays or to satisfy timing requirements specifying the maximum permitted interconnect delay. Placement and routing tools 276 may create orderly and efficient implementations of circuit designs for any targeted integrated circuit (e.g., for a given programmable integrated circuit such as a field-programmable gate array (FPGA).)

After an implementation of the desired circuit design has been generated using placement and routing tools 276 the implementation of the design may be analyzed and tested using analysis tools 278.

CAD tools such as logic synthesis and optimization tools 274 and/or placement and routing tools 276 may be part of a compiler suite (e.g., part of a suite of CAD tools provided by a programmable logic device vendor). In certain embodiments, CAD tools such as logic synthesis and optimization tools 274, placement and routing tools 276, and/or analysis tools 278 may automatically take into account the effects of crosstalk between interconnects while implementing a desired circuit design. If desired, logic synthesis and optimization tools 274, placement and routing tools 276, and/or analysis tools 278 may include timing analysis tools such as timing estimators, thereby enabling logic synthesis and optimization tools 274 and/or placement and routing tools 276 to satisfy performance requirements (e.g., timing requirements) before actually producing the integrated circuit.

After satisfactory optimization operations have been completed using CAD tools 220 and depending on the targeted integrated circuit technology, CAD tools 220 may produce a mask-level layout description of the integrated circuit or configuration data for programming the programmable logic device. For the remainder of this application, the term mask-level layout description is meant to include any means for implementing a circuit design in a semiconductor device. Such means may include a set of masks for photolithographic processes, an executable computer program that provides instructions to a microprocessor, configuration data for configuring programmable technology, which may be volatile or non-volatile, etc. Illustrative operations involved in using CAD tools 220 of FIG. 2B to produce the mask-level layout description of the integrated circuit are shown in FIG. 3.

Figure 3:
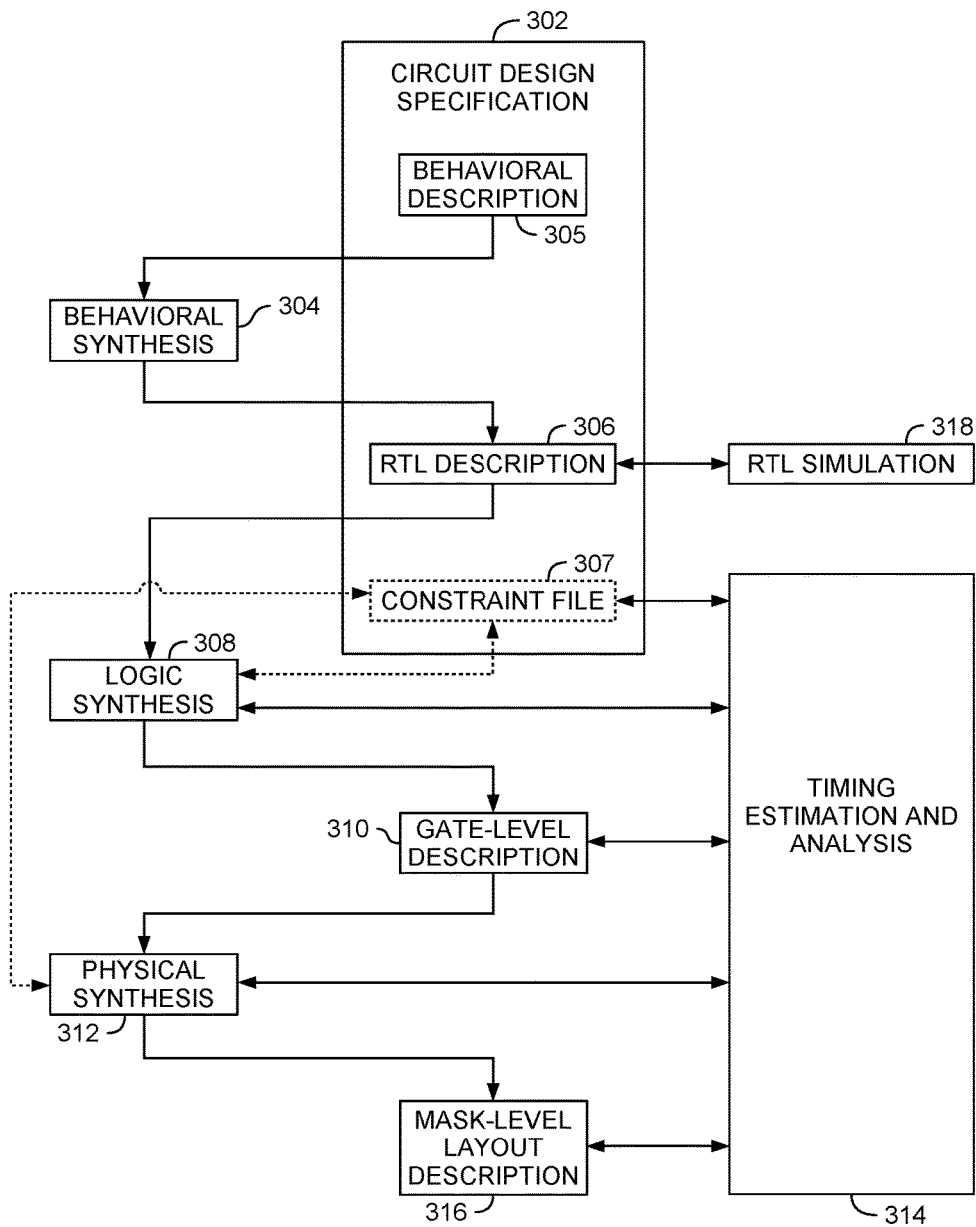
FIG. 3 is a diagram of a flow chart showing illustrative steps for designing an integrated circuit in accordance with an embodiment.

As shown in FIG. 3, a circuit designer may provide a circuit design specification 302, which is sometimes also referred to as a circuit design description or a circuit design. The circuit design specification 302 may include a behavioral description 305 provided in the form of an application code (e.g., C code, C++ code, SystemC code, etc.). In some scenarios, the circuit design specification may include a register transfer level (RTL) description 306. RTL description 306 may have any form of describing circuit functions at the register transfer level. For example, RTL description 306 may be provided using a hardware description language such as the Verilog Hardware Description Language (Verilog HDL or Verilog), the SystemVerilog Hardware Description Language (SystemVerilog HDL or SystemVerilog), or the Very High Speed Integrated Circuit Hardware Description Language (VHDL). If desired, RTL description 306 may be provided as a schematic representation.

Behavioral description 305 may include untimed or partially timed functional code (i.e., the application code does not describe cycle-by-cycle hardware behavior), whereas the RTL description 306 may include a fully timed circuit design description that details the cycle-by-cycle behavior of the circuit design at the register transfer level.

Circuit design specification 302 may include target criteria such as area use, power consumption, delay minimization, clock frequency optimization, or any combination thereof, which may be collectively referred to as constraints. Those constraints may be provided for individual paths, portions of individual paths, portions of the circuit design, or for the entire circuit design. For example, the constraints may be provided with the behavioral description 305, the RTL description 306 (e.g., as a pragma or as an assertion), in constraint file 307, or through input from the circuit designer (e.g., using the design and constraint entry tools 264 of FIG. 2B), to name a few.

In certain embodiments, a given path may have more than one constraint associated with the path, and some of these constraints may be in conflict with each other. For example, a first constraint received with behavioral description 305 for a given path may conflict with a second constraint received with RTL description 306 and with a third constraint received with constraint file 307. In this scenario, a predetermined priority of constraints, which may be defined explicitly or resolved implicitly by CAD tools such as CAD tools 220 of FIG. 2B, may determine which of the conflicting constraints is selected. For example, a constraint from the circuit designer or constraint file 307 may override the constraints received from other sources, and a constraint received with RTL description 306 may override a constraint received with behavioral description 305.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools such as CAD tools 220 of FIG. 2B. For example, a constraint defined at a higher level of the circuit design hierarchy may override a constraint at a lower level. Alternatively, a constraint defined at a lower level of the circuit design hierarchy may override a constraint at a higher level, or individual levels of the circuit design hierarchy may be given priority over other levels of circuit design hierarchy.

Constraints included in circuit design specification 302 may be conveyed to CAD tools such as CAD tools 220 of FIG. 2B in the form of variables, parameters, compiler directives, macros, pragmas, or assertions, just to name a few. CAD tools 220 may use constraint file 307, which may include a portion or all of the constraints. In some scenarios, a portion or all of the constraints may be embedded in behavioral description 305 and/or RTL description 306. If desired, the circuit designer may define the constraints using design and constraint entry tools 264 of FIG. 2B.

At step 304, behavioral synthesis (sometimes also referred to as algorithmic synthesis) may be performed to convert behavioral description 305 into RTL description 306. Step 304 may be skipped if the circuit design specification is already provided in form of an RTL description.

At step 318, simulation tools (e.g., behavioral simulation tools 272 of FIG. 2B) may perform an RTL simulation of RTL description 306, which may verify the functional performance of the RTL description. For example, during RTL simulation 318, actual results obtained from simulating the behavior of RTL description 306 may be compared with expected results. If the functional performance of RTL description 306 is incomplete or incorrect, the circuit designer can make changes to the HDL code (as an example).

During step 308, logic synthesis tools (e.g., logic synthesis and optimization tools 274 of FIG. 2B) may perform logic synthesis to generate gate-level description 310. During step 312, place and route tools (e.g., placement and routing tools 276 of FIG. 2B) may perform physical synthesis operations to place and connect the different gates in gate-level description 310 in a preferred location on the targeted integrated circuit to meet given target criteria (e.g., minimize area and maximize routing efficiency or minimize path delay and maximize clock frequency or any combination thereof). The output of physical synthesis 312 is a mask-level layout description 316.

CAD tools 220 may include a timing analysis tool (e.g., as part of analysis tools 278 of FIG. 2B) that performs timing estimation and analysis 314 based on one or more clock signals. Timing estimation and analysis 314 may use a timing model of the targeted integrated circuit (e.g., based on the resistance and capacitance of interconnects, the propagation delay from the input port to the output port of combinational logic, etc.) to generate estimated timing information. The estimated timing information may be based on signal propagation delays along paths such as clock paths (e.g., connections from inputs of the integrated circuit or from internally generated clock ports to the clock port of a synchronous circuit element such as a register or a memory circuit), data paths (e.g., connections from an input of the integrated circuit or a data output port of a synchronous circuit element to an output of the integrated circuit or to the data input port of another synchronous circuit element), etc.

If desired, the timing estimation and analysis 314 may generate estimated timing information by determining data transfers between synchronous circuit elements including the data transfers between synchronous circuit elements that are synchronous to different clocks. As an example, consider the scenario in which a first register that is synchronized to a first clock signal that is generated by a first clock generator sends a data signal to a second register that is synchronized to a second clock signal that is generated by a second clock generator.

In this scenario, timing estimation and analysis 314 may determine a data arrival time at the second register based on the launch edge of the first clock signal, the delay of the first clock signal from the first clock generator to the output port of the first register, and the delay of the data signal from the output port of the first register to the input port of the second register. The launch edge of a clock signal may be the active edge (e.g., rising and/or falling edge) of the clock signal that sends a data signal out of a synchronous circuit element (e.g., a register). In other words, the launch edge may act as a source trigger event for a data signal transfer from one synchronous circuit element to another.

If desired, timing estimation and analysis 314 may determine a data required time at the second register based on the latch edge of the second clock signal, the delay of the second clock signal from the second clock generator to the clock input port of the second register, and the intrinsic setup time of the second register. A latch edge of a clock signal may be the active edge (e.g., rising and/or falling edge) of the clock signal that captures a data signal at the data port of a synchronous circuit element. In other words, the latch edge may act as a destination trigger event for a data signal transfer.

If desired, timing estimation and analysis 314 may perform further analysis. For example, timing estimation and analysis 314 may compare data arrival time with data required time or the estimated signal propagation delays with timing constraints (e.g., with timing constraints from constraint file 307) to generate timing analysis data. The timing analysis data may, if desired, be produced based on metrics such as interconnect congestion, on metrics that are indicative of timing margins such as slack (e.g., the difference between the data required time that the data arrival time of a signal) or slack-ratios, or on other timing metrics.

In some embodiments, timing estimation and analysis 314 may use timing constraints based on constraints of a clock signal (e.g., the frequency and/or the duty cycle of the clock signal). Timing constraints that are based on constraints of the clock signal are sometimes also referred to as clock constraints. Based on these clocks constraints, timing estimation and analysis 314 may analyze the relationship between clock signals in the same or in different clock domains. For example, timing estimation and analysis may analyze the setup relationship and/or the hold relationship between clock signals.

To perform a clock setup check, timing estimation and analysis 314 may analyze the setup relationship between launch and latch edges for a given path between synchronous circuit elements. For a latch edge at the destination synchronous circuit element, timing estimation and analysis 314 may use the closest previous clock edge at the source synchronous circuit element as the launch edge. Timing estimation and analysis 314 may use the most restrictive setup relationship to determine whether the timing constraints are met.

In certain embodiments, timing estimation and analysis 314 may report the result of clock setup checks as slack values. If desired, slack values may represent the timing margin by which a timing constraint is met or not met. A positive slack value may indicate the timing margin by which a timing constraint is met; a negative slack value may indicate the timing margin by which a timing constraint is not met.

To perform a clock hold check, timing estimation and analysis 314 may determine a hold relationship for a given setup relationship between synchronous circuit elements. In certain embodiments, timing estimation and analysis 314 may perform two clock hold checks for a given setup relationship. The first clock hold check may determine that the data signal launched by the current launch edge is not captured by the previous latch edge. The second clock hold check may determine that the data signal launched by the next launch edge is not captured by the current latch edge. From the possible hold relationships, timing estimation and analysis 314 may select the most restrictive hold relationship, which may be the hold relationship with the smallest difference between the latch and launch edges. Timing estimation and analysis may thereby determine the minimum allowable delay for a signal to propagate along the path between the synchronous circuit elements.

In some embodiments, timing estimation and analysis 314 may perform multi-corner timing analysis to verify a circuit design under a variety of operating conditions such as voltage, process, and temperature.

Figure 4A:
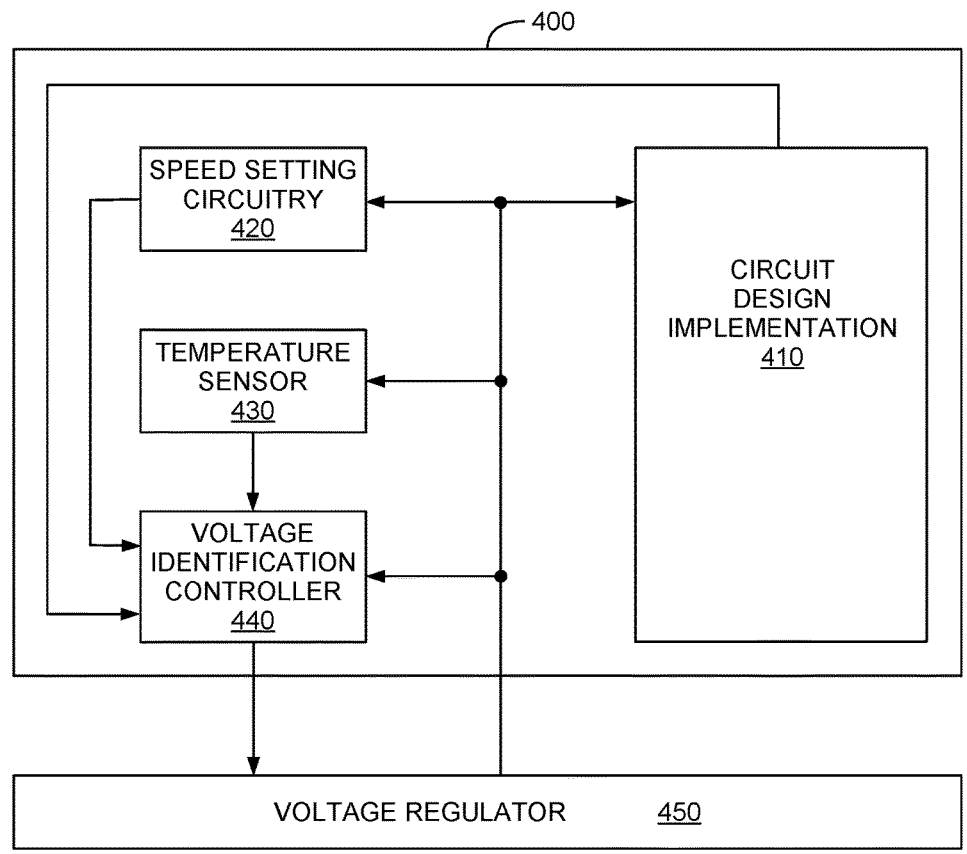
FIG. 4A is a diagram of an illustrative integrated circuit with voltage identification controller and external voltage regulator.

If desired, a voltage identification controller may use the timing analysis data to control the supply voltage of an integrated circuit. FIG. 4A is a diagram of an illustrative integrated circuit 400 with voltage identification controller 440 that controls external voltage regulator 450 based on the timing analysis data. As shown in FIG. 4A, integrated circuit 400 may include circuit design implementation 410, speed setting circuitry 420, temperature sensor 430, and voltage identification controller 440. Integrated circuit 400 may be coupled to voltage regulator 450, which may provide one or more supply voltages to integrated circuit 400.

Figure 4B:
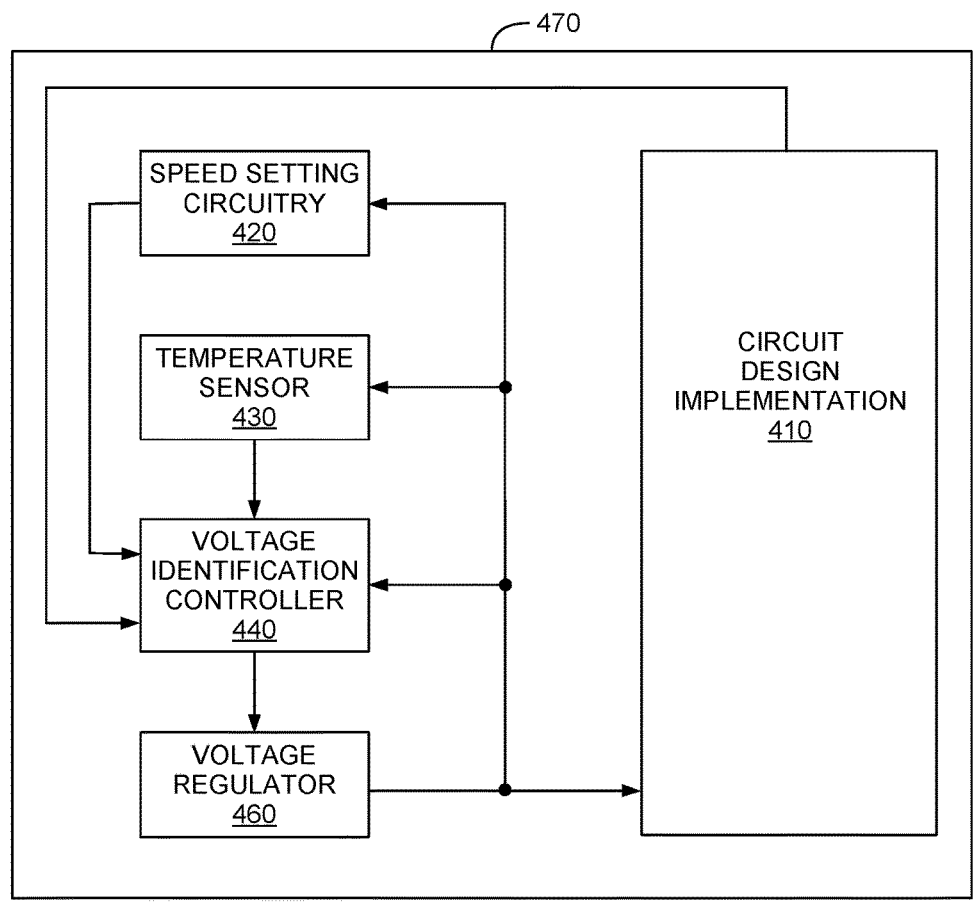
FIG. 4B is a diagram of another illustrative integrated circuit with voltage identification controller and internal voltage regulator.

FIG. 4B is a diagram of another illustrative integrated circuit 470 with voltage identification controller 440 that controls internal voltage regulator 460 based on the timing analysis data. As shown in FIG. 4B, integrated circuit 470 may include circuit design implementation 410, speed setting circuitry 420, temperature sensor 430, voltage identification controller 440, and voltage regulator 460, which may provide one or more supply voltages to integrated circuit 470.

In some embodiments, voltage regulators 450 and 460 may provide a nominal supply voltage to integrated circuits 400 and 470, respectively, based on a control signal received from voltage identification controller 440. If desired, voltage identification controller 440 may generate a different control signal and provide the different control signal to voltage regulators 450 and 460, respectively. Upon receipt of the different control signal from voltage identification controller 440, voltage regulators 450 and 460 may provide a different operating voltage to integrated circuits 400 and 470, respectively.

Voltage identification controller 440 may generate the control signal for voltage regulators 450 and 460, respectively, based on signals received from circuit design implementation 410, speed setting circuitry 420, and/or temperature sensor 430. Speed setting circuitry 420 may provide a signal indicative of the speed at which integrated circuits 400 and 470 may operate under nominal conditions, respectively (e.g., within a predetermined temperature range and at a nominal supply voltage). For example, speed setting circuitry 420 may provide information based on the process corner at which integrated circuits 400 and 470 were fabricated, respectively (i.e., the variation of fabrication parameters used in applying the design of integrated circuit 400 or 470 to a semiconductor wafer). Examples for speed setting circuitry 420 may include a circuit with fuses, antifuses, or any other circuitry that may store information about the speed settings of the integrated circuit. For example, a blown fuse may indicate a predetermined speed grade based on the process corner.

Temperature sensor 430 may measure the temperature of integrated circuits 400 and 470, respectively, at power-up and during operation of circuit design implementation 410 and provide a signal indicative of the current temperature to voltage identification controller 440. If desired, voltage identification controller 440 may direct voltage regulators 450 and 460, respectively, to adapt the supply voltage to a change in temperature based on the signal received from temperature sensor 430.

Circuit design implementation 410 with integrated circuits 400 and 470, respectively may have a predetermined target performance. For example, circuit design implementation 410 may include timing constraints. If desired, circuit design implementation 410 may include timing margins (e.g., determined by timing estimation and analysis 314 of FIG. 3). These timing margins may be based on operating circuit design implementation 410 with integrated circuits 400 and 470, respectively, at the nominal operating voltage, which may be defined based on speed setting circuitry 420.

As an example, consider the scenario in which circuit design implementation 410 with integrated circuits 400 and 470, respectively, has positive timing margins (i.e., the timing constraints are met) at the nominal operating voltage. In this scenario, the circuit design implementation 410 may provide a signal that is indicative of the timing margins to voltage identification controller 440, and voltage identification controller 440 may send a control signal to the respective voltage regulators 450 and 460. Upon receipt of the control signal from voltage identification controller 440, respective voltage regulators 450 and 460 may reduce the supply voltage from the nominal operating voltage to a current voltage that is lower than the nominal operating voltage, thereby reducing the power consumption of integrated circuits 400 and 470, respectively. Operating the respective integrated circuits 400 and 470 at a voltage that is lower than the nominal operating voltage may slow down the signal propagation time in the respective integrated circuit compared to operating the respective integrated circuit at the nominal operating voltage, and thereby reduce the timing margins of circuit design implementation 410. However, circuit design implementation 410 may remain functioning within the specifications of a circuit designer as long as the timing constraints are met and timing margins are positive.

In some embodiments, logic synthesis tools (e.g., logic synthesis and optimization tools 274 of FIG. 2B) and/or place and route tools (e.g., placement and routing tools 276 of FIG. 2B) may perform logic synthesis (308 of FIG. 3) and/or physical synthesis (312 of FIG. 3) with the goal of maximizing the timing margins of circuit design implementation 410. For example, logic synthesis 308 and/or physical synthesis 312 may use timing information (e.g., obtained from executing timing analysis and estimation 318 of FIG. 3 using analysis tools 278 of FIG. 2) to optimize timing margins in gate-level description 310 of FIG. 3 and/or mask-level layout description 316 of FIG. 3 compared to performing logic synthesis 308 and/or physical synthesis 312 without using timing information. Performing logic synthesis with the goal of maximizing timing margins is sometimes also referred to as timing-driven logic synthesis. Similarly, performing physical synthesis with the goal of maximizing timing margins is sometimes also referred to as timing-driven physical synthesis. As a result of the optimized timing margins produced by timing-driven logic synthesis and/or timing-driven physical synthesis, voltage identification controller 440 may reduce the supply voltage by a corresponding amount from the nominal operating voltage to the current voltage.

In certain embodiments, voltage identification controller 440 may store information about the relationship between reducing the voltage and slowing down the operation of the integrated circuit. For example, voltage identification controller 440 may store a table that relates a predetermined reduction in voltage to a resulting reduction in speed (e.g., caused by increased signal propagation delays).

As an example, consider the scenario in which voltage identification controller 440 includes a table that relates a stepwise reduction in voltage to a percent-wise reduction in speed (e.g., a supply voltage reduction of 0.1V, 0.15V, 0.2V, and 0.25V from the nominal operating voltage leads to a 5%, 10%, 15%, and 20% slow-down of the integrated circuit, respectively). Consider further that voltage identification controller 440 receives a signal from circuit design implementation 410 that indicates a timing margin as a percentage (e.g., in form of a slack ratio). In this scenario, voltage identification controller 440 may determine a reduction in supply voltage by looking up the relevant reduction from the nominal operating voltage in the table based on the given timing margin (e.g., voltage identification controller 440 may select to reduce the supply voltage by 0.15V from the nominal operating voltage if the given percentage of the timing margin is 10%).

If desired, voltage identification controller 440 may select a different supply voltage reduction amount than indicated in the table, for example to conserve a certain amount of positive timing margin (e.g., voltage identification controller may select to reduce the supply voltage by 0.1V even though the timing margin is 10%). In some scenarios, the given timing margin may lie in between intervals of the table and voltage identification controller 440 may select a conservative supply voltage reduction (e.g., voltage identification controller 440 may select to reduce the supply voltage by 0.15V if the timing margin is 12%).

In some scenarios, different portions of integrated circuits 400 and 470, respectively, may slow down differently when the supply voltage is reduced. For example, the interconnection resources 116 of integrated circuit 100 of FIG. 1 may slow down at a different rate than programmable logic regions 118 when the supply voltage is reduced. As another example, different components of programmable logic regions 118 such as look-up tables, logic gates (e.g., logic AND gates, logic OR gates, logic exclusive OR gates, inverter gates, etc.), arithmetic operators (e.g., adders, multipliers, etc.), and multiplexers may slow down at a different rate when the supply voltage is reduced.

In some embodiments, voltage identification controller 440 may maintain a table that includes the reduction in speed for different components of integrated circuit 400 when the supply voltage is reduced. If desired, voltage identification controller 440 may select to reduce the supply voltage based on the component of integrated circuit 400 and 470, respectively, that has the biggest slow down relative to the reduction in supply voltage. In certain embodiments, voltage identification controller 440 may receive detailed timing analysis data from circuit design implementation 410, which may include a list of the components in a given path. Voltage identification controller 440 may then direct voltage regulators 450 and 460, respectively, to change the supply voltage based on an analysis of the timing margins in connection with the components on the paths and their respective sensitivity to changes in supply voltage.

If desired, voltage identification controller 440 may associate a predetermined number of voltage identifiers with a predetermined number of voltages. Voltage identification controller 440 may communicate with voltage regulators 450 and 460, respectively, through a parallel output that drives the respective voltage regulator directly, through a multi-wire serial interface (e.g., the Inter-Integrated Circuit (I2C), the System Management Bus (SMBus), the Power Management Bus (PMBus), or a similar interface), or through a one-wire pulse width modulated (PWM) output.

Accordingly, voltage regulators 450 and 460 may be implemented as a parallel input digital voltage regulator module with a high current powertrain, a multi-wire serial voltage regulator module, or as an adjustable voltage regulator module with an analog circuit that converts the pulse width modulated (PWM) signal to some means that controls the respective voltage regulator output.

Voltage regulators 450 and 460 may each provide one or more voltages as directed by voltage identification controller 440. Voltage regulators that provide more than one supply voltage at the same time are sometimes also referred to as multi-phase voltage regulators. Similarly, integrated circuits 400 and 470, respectively, may receive supply voltages from one or more voltage regulators.

The voltage regulator(s) may be located outside an integrated circuit (e.g., voltage regulator 450 is located outside of integrated circuit 400 in FIG. 4A) or inside an integrated circuit (e.g., voltage regulator 460 is located inside integrated circuit 470 of FIG. 4B). For example, the voltage regulator(s) may be on the same die, in the same package, on the same printed circuit board (PCB), on another printed circuit board (PCB), or any combination thereof, as the integrated circuit that receives the supply voltage(s) from the voltage regulator(s).

Similarly, integrated circuits 400 and 470, respectively, may include partitions that are coupled to supply voltage rails that are independent of each other. These supply voltage rails may distribute one or more different supply voltages from one or more voltage regulators to the partitions. Those partitions that may receive different supply voltages are sometimes also referred to as voltage islands or power islands.

Consider the scenario in which circuit design implementation 410 provides different timing margins for different power islands to voltage identification controller 440. In this scenario, voltage identification controller 440 may select a reduction in supply voltage from the nominal operating voltage based on the smallest timing margin of the different partitions and provide the same supply voltage to all power islands. Alternatively, voltage identification controller 440 may select different supply voltages for the different power islands based on the different timing margins.

In some embodiments, place and route tools (e.g., placement and routing tools 276 of FIG. 2B) may perform physical synthesis (312 of FIG. 3) with the goal of minimizing the power consumption of circuit design implementation 410. For example, physical synthesis 312 may attempt to optimize the assignment of components from gate-level description 310 to partitions and/or the allocation of different supply voltages to different power islands. For example, physical synthesis 312 may attempt to place components from gate-level description 310 that are associated with paths that have similar timing margins within the same partition. If desired, physical synthesis 312 may perform other or additional steps to minimize the power consumption of circuit design implementation 410. For example, physical synthesis 312 may attempt to place components from gate-level description 310 that are associated with timing margins under a predetermined threshold within the same partition, place components from gate-level description 310 that are associated with timing margins over a predetermined threshold within the same partition, maximize timing margins within each partition in isolation, etc.

In some embodiments, a timing margin change in a portion of the integrated circuit may affect the timing margins in other portions of the integrated circuit. For example, consider the scenario in which first and second portions of the integrated circuit provide data to a third portion of the integrated circuit at a first data rate. Consider further that the first portion of the integrated circuit is updated to provide the data at a second data rate that is lower than the first data rate to the third portion of the integrated circuit (e.g., as a result of a parameter switch, as a result of partial reconfiguration, etc.).

In this scenario, the timing margins of the first portion of the integrated circuit may increase due to the change in data rate. As a result, the data processing in the second portion of the integrated circuit may adapt to the second data rate in the first portion of the integrated circuit such that the data from the first and second portions of the integrated circuit arrive synchronously at the third portion of the integrated circuit, thereby increasing the timing margins of the second portion of the integrated circuit.

Similarly, the third portion of the integrated circuit may adapt to the second data rate because the data from the first and second portions of the integrated circuit arrive at the lower second data rate, thereby increasing the timing margins of the third portion of the integrated circuit.

In certain embodiments, the first, second, and third portions of the integrated circuit may report the updated timing margins to voltage identification controller 440. As a result, voltage identification controller 440 may adjust the current supply voltage to the first, second, and third portions of the integrated circuit from the previous voltage level that was adapted to operate the first, second, and third portions of the integrated circuit at the first data rate to a new voltage level that is adapted to operate the first, second, and third portions of the integrated circuit based on the new timing margins.

Consider that circuit design implementation 410 of FIGS. 4A and 4B includes integrated circuit 100 of FIG. 1. Consider further that integrated circuit 100 has a first supply voltage that powers programmable logic regions 118 and a second supply voltage that powers input-output circuitry 112. For example, programmable logic region 118 may implement an arithmetic circuit, while input-output circuitry 112 may implement a Gigabit Ethernet (GigE) protocol, such as the 10GigE protocol. In this example, programmable logic regions 118 may operate at a nominal operating voltage (e.g., 0.9V) that is different than the nominal operating voltage of input-output circuitry 112 (e.g., 1.1V for implementing the 10GigE protocol). Furthermore, programmable logic regions 118 may provide a first timing margin for the arithmetic circuit and input-output circuitry 112 may provide a second timing margin that is different than the first timing margin for the 10GigE protocol implementation. If desired, voltage identification controller 440 may select a first supply voltage reduction from the nominal operating voltage for programmable logic regions 118 based on the first timing margin and select a second supply voltage reduction from the nominal operating voltage for input-output circuitry 112 based on the second timing margin.

In some scenarios, the timing margins may change during the operation of the integrated circuit (e.g., as result of a parameter switch, as a result of partial reconfiguration, etc.). As an example, consider that a parameter causes input-output circuitry 112 to change the implementation of the Gigabit Ethernet protocol from the 10GigE protocol version to the 1GigE protocol version. As a result, input-output circuitry 112 may report different timing margins to voltage identification controller 440. As a result, voltage identification controller 440 may adjust the current supply voltage to input-output circuitry 112 from the previous voltage level that was adapted to operate the 10GigE protocol with input-output circuitry 112 to a new voltage level that is adapted to operate the 1GigE protocol with input-output circuitry 112 based on the new timing margins.

As another example, consider that partial reconfiguration replaces the implementation of an arithmetic circuit in programmable logic region 118 with the implementation of a control circuit in programmable logic region 118. As a result, programmable logic region 118 may report different timing margins to voltage identification controller 440, which may adjust the current supply voltage to programmable logic region 118 from the previous voltage level that was adapted to operate the arithmetic circuit with programmable logic region 118 to a new voltage level that is adapted to operate the control circuit with programmable logic region 118 based on the new timing margins.

Figure 5:
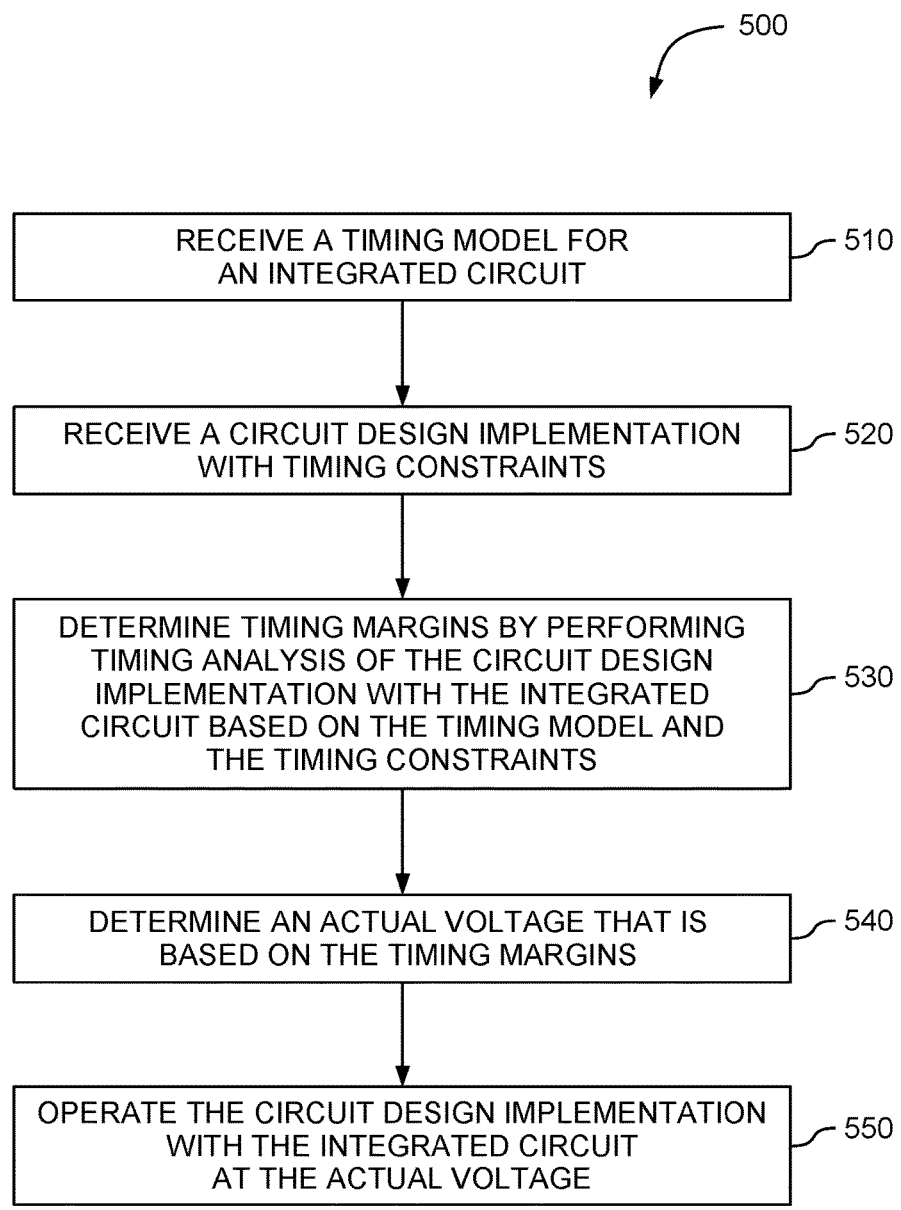
FIG. 5 is a diagram of a flow chart showing illustrative steps for operating an integrated circuit at an actual voltage level in accordance with an embodiment.

FIG. 5 is a diagram of flow chart 500 showing illustrative steps for operating an integrated circuit at an actual voltage level in accordance with an embodiment. During step 510, a CAD tool may receive a timing model for an integrated circuit. For example, CAD tools 220 of FIG. 2A may receive a timing model for integrated circuit 100 of FIG. 1. As another example, analysis tools 276 of FIG. 2B may receive a timing model for integrated circuit 100 of FIG. 1.

During step 520, the CAD tool may receive a circuit design implementation with timing constraints. For example, CAD tools 220 of FIG. 2A may receive a circuit design implementation with timing constraints from database 230. As another example, analysis tools 278 of FIG. 2B may receive mask-level layout description 316 and timing constraints from constraint file 307 of FIG. 3.

During step 530, the CAD tool may determine timing margins by performing timing analysis of the circuit design implementation with the integrated circuit based on the timing model and the timing constraints. For example, a timing analysis tool as part of analysis tools 278 of FIG. 2B may perform timing estimation and analysis 314 (see FIG. 3) of mask-level layout description 316 based on the timing model and the timing constraints from constraint file 307.

During step 540, the CAD tool may determine an actual voltage that is based on the timing margins. For example, the timing analysis tool as part of analysis tools 278 of FIG. 2B may select another voltage level that is lower than the nominal voltage level and perform timing estimation and analysis 314 (see FIG. 3) of mask-level layout description 316 based on the reduced voltage level and the timing constraints from constraint file 307 to determine that the timing constraints are still met at the reduced voltage level.

During step 550, the CAD tool may operate the circuit design implementation with the integrated circuit at the actual voltage. For example, CAD tools 220 of FIG. 2B may configure integrated circuit 100 of FIG. 1 to operate the mask-level layout description 316 of FIG. 3 at the actual voltage level.

Figure 6:
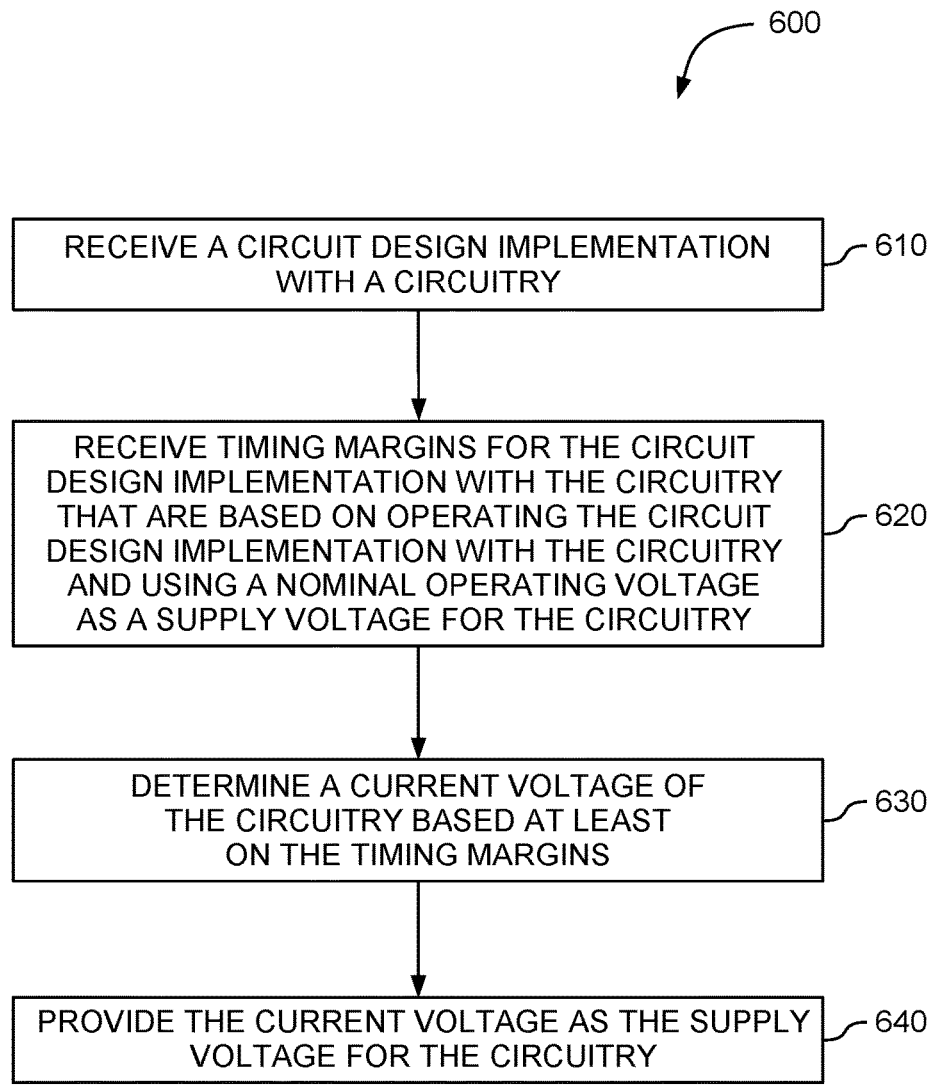
FIG. 6 is a diagram of a flow chart showing illustrative steps for providing a supply voltage to circuitry that is associated with a nominal operating voltage in accordance with an embodiment.

FIG. 6 is a diagram of flow chart 600 showing illustrative steps for providing a supply voltage to circuitry that is associated with a nominal operating voltage in accordance with an embodiment. During step 610, the circuitry may receive a circuit design implementation with the circuitry. For example, at least a portion of integrated circuit 400 of FIG. 4A or at least a portion of integrated circuit 470 of FIG. 4B may receive circuit design implementation 410.

During step 620, the circuitry may receive timing margins for the circuit design implementation with the circuitry that are based on operating the circuit design implementation with the circuitry and using a nominal operating voltage as a supply voltage for the circuitry. For example, voltage identification controller 440 of FIGS. 4A and 4B may receive timing margins for circuit design implementation 410 that are based on operating circuit design implementation 410 with the at least a portion of integrated circuit 400 of FIG. 4A or the at least a portion of integrated circuit 470 of FIG. 4B at the nominal voltage level.

During step 630, the circuitry may determine a current voltage level of the circuitry based at least on the timing margins. For example, voltage identification controller 440 of FIGS. 4A and 4B may determine a current voltage based on the timing margins received from circuit design implementation 410 and/or the current temperature received from temperature sensor 430.

During step 640, the circuitry may provide the current voltage as the supply voltage for the circuitry. For example, voltage identification controller 440 of FIGS. 4A and 4B may direct voltage regulator 450 of FIG. 4A and voltage regulator 460 of FIG. 4B, respectively, to provide the current voltage as the supply voltage to integrated circuits 400 and 470, respectively.

Figure 7:
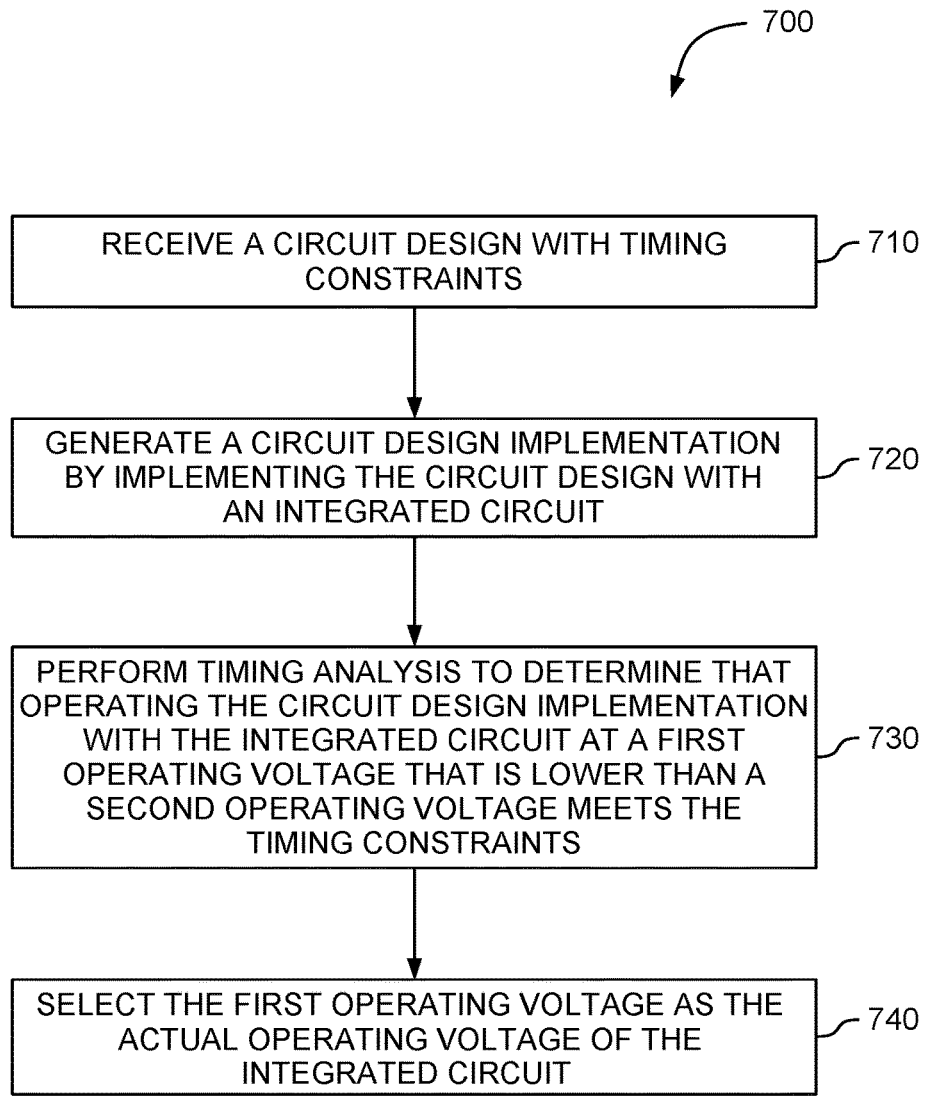
FIG. 7 is a diagram of a flow chart showing illustrative steps for selecting an actual operating voltage of an integrated circuit in accordance with an embodiment.

FIG. 7 is a diagram of flow chart 700 showing illustrative steps for selecting an actual operating voltage of an integrated circuit in accordance with an embodiment. During step 710, a CAD tool may receive a circuit design with timing constraints. For example, design and constraint entry tool 264 of CAD tools 220 of FIG. 2B may receive circuit design specification 302 of FIG. 3, which may include RTL description 305 and constraint file 307, as an example.

During step 720, the CAD tool may generate a circuit design implementation by implementing the circuit design with an integrated circuit. For example, logic synthesis and optimization tools 274 of FIG. 2B may perform logic synthesis 308 of FIG. 3 to generate gate-level description 310 based on RTL description 306 and constraints from constraint file 307, and placement and routing tools 276 may perform physical synthesis 312 to generate mask-level layout description 316 based on gate-level description 310 and constraints from constraint file 307.

During step 730, the CAD tool may perform timing analysis to determine that operating the circuit design implementation with the integrated circuit at a first operating voltage that is lower that a second operating voltage meets the timing constraints. For example, analysis tools 278 of FIG. 2B may perform timing estimation and analysis 314 of FIG. 3 using mask-level layout description 316 and timing constraints from constraint file 307 to determine that operating mask-level layout description 316 at a current operating voltage that is lower than the nominal operating voltage meets the timing constraints of constraint file 307.

During step 740, the CAD tool may select the first operating voltage as the actual operating voltage of the integrated circuit. For example, CAD tool 220 of FIG. 2B may configure integrated circuit 100 of FIG. 1 with mask-level layout description 316 of FIG. 3 and specifying the current operating voltage as the actual operating voltage of integrated circuit 100.

The method and apparatus described herein may be incorporated into any suitable electronic device or system of electronic devices. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of operating a circuit at different voltage levels is desirable. The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an integrated circuit comprising:
receiving a timing model for the integrated circuit;
receiving a circuit design implementation with the integrated circuit with timing constraints;
determining timing margins by performing timing analysis of the circuit design implementation with the integrated circuit based on the timing model and the timing constraints;
performing a lookup operation in a table that relates a plurality of more than two stepwise reductions in voltage from a nominal operating voltage to corresponding percent-wise reductions in operating speed of the integrated circuit to determine an actual voltage that is based on the timing margins; and
operating the circuit design implementation with the integrated circuit at the actual voltage.

2. The method of claim 1, wherein determining timing margins further comprises:

generating estimated timing information based on the timing model and signal propagation delays along paths between synchronous circuit elements in the circuit design implementation with the integrated circuit; and determining the timing margins by comparing the estimated timing information with the timing constraints.

3. The method of claim 1, wherein operating the circuit design implementation with the integrated circuit at the actual voltage reduces power consumption of the integrated circuit compared to operating the circuit design implementation with the integrated circuit at the nominal operating voltage that is determined independently of the timing margins.

4. The method of claim 1, further comprising:
performing a synthesis operation on the circuit design implementation to generate an improved circuit design implementation with improved timing margins; and
determining a current voltage that is based on the improved timing margins; and
operating the improved circuit design implementation with the integrated circuit at the current voltage.

5. The method of claim 4, wherein the synthesis operation is selected from the group consisting of behavioral synthesis, logic synthesis, and physical synthesis.

6. The method of claim 1, further comprising:
changing at least a portion of the circuit design implementation with the integrated circuit to generate an updated circuit design implementation with the integrated circuit that has new timing margins that are different than the timing margins.

7. The method of claim 6, further comprising:
changing the actual voltage to a current voltage that is different than the actual voltage in response to changing the at least a portion of the circuit design implementation with the integrated circuit; and
operating the updated circuit design implementation with the integrated circuit at the current voltage.

8. The method of claim 6, wherein changing the at least a portion of the circuit design implementation further comprises:
performing a partial reconfiguration operation that configures at least a portion of the integrated circuit with the updated circuit design implementation.

9. The method of claim 6, wherein changing the at least a portion of the circuit design implementation further comprises:
changing a parameter in the circuit design implementation from a first parameter setting to a second parameter setting, wherein the first parameter setting enables a first circuit and disables a second circuit, and wherein the second parameter setting disables the first circuit and enables the second circuit.

10. A non-transitory computer-readable storage medium including a sequence of instructions stored thereon for causing a computer to execute a method for operating an integrated circuit comprising:
receiving a timing model for the integrated circuit;
receiving a circuit design implementation with the integrated circuit with timing constraints;
determining timing margins by performing timing analysis of the circuit design implementation with the integrated circuit based on the timing model and the timing constraints;
performing a lookup operation in a table that relates a plurality of more than two stepwise reductions in voltage from a nominal operating voltage to corresponding percent-wise reductions in operating speed of the integrated circuit to determine an actual voltage that is based on the timing margins; and
operating the circuit design implementation with the integrated circuit at the actual voltage.

11. The non-transitory computer readable medium of claim 10, wherein determining timing margins further comprises:
generating estimated timing information based on the timing model and signal propagation delays along paths between synchronous circuit elements in the circuit design implementation with the integrated circuit; and
determining the timing margins by comparing the estimated timing information with the timing constraints.

12. The non-transitory computer readable medium of claim 10, wherein operating the circuit design implementation with the integrated circuit at the actual voltage reduces power consumption of the integrated circuit compared to operating the circuit design implementation with the integrated circuit at the nominal operating voltage that is determined independently of the timing margins.

13. The non-transitory computer readable medium of claim 10, wherein the method further comprises:
performing a synthesis operation on the circuit design implementation to generate an improved circuit design implementation with improved timing margins; and
determining a current voltage that is based on the improved timing margins; and
operating the improved circuit design implementation with the integrated circuit at the current voltage.

14. The non-transitory computer readable medium of claim 13, wherein the synthesis operation is selected from the group consisting of behavioral synthesis, logic synthesis, and physical synthesis.

15. The non-transitory computer readable medium of claim 10, wherein the method further comprises:
changing at least a portion of the circuit design implementation with the integrated circuit to generate an updated circuit design implementation with the integrated circuit that has new timing margins that are different than the timing margins.

16. The non-transitory computer readable medium of claim 15, wherein the method further comprises:
changing the actual voltage to a current voltage that is different than the actual voltage in response to changing the at least a portion of the circuit design implementation with the integrated circuit; and
operating the updated circuit design implementation with the integrated circuit at the current voltage.

17. The non-transitory computer readable medium of claim 15, wherein changing the at least a portion of the circuit design implementation further comprises:
performing a partial reconfiguration operation that configures at least a portion of the integrated circuit with the updated circuit design implementation.

18. The non-transitory computer readable medium of claim 15, wherein changing the at least a portion of the circuit design implementation further comprises:
changing a parameter in the circuit design implementation from a first parameter setting to a second parameter setting, wherein the first parameter setting enables a first circuit and disables a second circuit, and wherein the second parameter setting disables the first circuit and enables the second circuit.

* * * * *